(12) United States Patent
Macpherson et al.

(10) Patent No.: US 6,525,910 B1
(45) Date of Patent: Feb. 25, 2003

(54) THREADABLY MOUNTABLE DRIVE ACTUATOR BEARING ASSEMBLY

(75) Inventors: Aaron Steve Macpherson, Fort Collins, CO (US); Gary Frank Kelsic, Longmont, CO (US); Bruce Joseph Oxley, Boulder, CO (US); Richard W. Deichert, Broomfield, CO (US); Tom Konetski, Berthoud, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 20 days.

(21) Appl. No.: 09/678,603

(22) Filed: Oct. 4, 2000

Related U.S. Application Data

(60) Provisional application No. 60/205,929, filed on May 22, 2000.

(51) Int. Cl.[7] .............................. G11B 5/55; G11B 21/12
(52) U.S. Cl. ................................. 360/265.6; 360/265.7
(58) Field of Search .......................... 360/265.2, 265.6, 360/265.7; 29/603.03; 384/280, 281, 441, 537, 540, 295, 296

(56) References Cited

U.S. PATENT DOCUMENTS

| | | | |
|---|---|---|---|
| 3,767,866 A | 10/1973 | Higashida et al. | |
| 4,058,845 A | 11/1977 | Zahn | |
| 4,240,677 A | 12/1980 | Payne et al. | |
| 5,146,450 A * | 9/1992 | Brooks et al. | 360/265.6 |
| 5,414,578 A * | 5/1995 | Lian et al. | 360/291 |
| 5,491,598 A | 2/1996 | Stricklin et al. | |
| 5,532,889 A | 7/1996 | Stefansky et al. | |
| 5,559,650 A | 9/1996 | Repphun et al. | |
| 5,627,702 A | 5/1997 | Kelemen et al. | |
| 5,666,242 A | 9/1997 | Edwards et al. | |
| 5,751,519 A | 5/1998 | Hata | |
| 5,793,574 A * | 8/1998 | Cranson et al. | 360/261.3 |
| 5,894,382 A * | 4/1999 | Hyde | 360/265.6 |
| 6,128,165 A * | 10/2000 | Baker et al. | 360/265.6 |
| 6,185,075 B1 * | 2/2001 | Tsujino et al. | 360/265.7 |
| 6,256,173 B1 * | 7/2001 | Chee et al. | 360/265.6 |
| 6,342,992 B1 * | 1/2002 | Prater et al. | 360/265.6 |

* cited by examiner

Primary Examiner—David L. Ometz
(74) Attorney, Agent, or Firm—Derek J. Berger

(57) ABSTRACT

An actuator assembly suitable for a disc drive with at least one rotating disc for storing information. The actuator assembly has an actuator body having a mounting opening with at least a portion of the mounting opening being threaded and a bearing cartridge having an outer surface with at least a portion of the outer surface being threaded. The bearing cartridge is threadably received within the mounting opening of the actuator body so that the actuator body is releasably secured to the bearing cartridge. A method for securing an actuator body to a bearing cartridge in an actuator assembly of a disc drive is also provided.

19 Claims, 5 Drawing Sheets

THREADABLY MOUNTABLE DRIVE ACTUATOR BEARING ASSEMBLY

RELATED APPLICATIONS

This application claims the benefit of U.S. Provisional Application No. 60/205,929 filed on May 22, 2000.

Field of the Invention

The present invention relates generally to an actuator assembly in a disc drive, and more particularly to an actuator assembly having a bearing cartridge threadably mountable within an actuator body.

BACKGROUND OF THE INVENTION

Generally, the disc drive used as an auxiliary memory device in a computer includes at least one disk which is rotated at a high speed by a spindle motor, and an actuator arm assembly having an actuator body and a bearing cartridge. The actuator body has at least one arm which rotates in response to a voice coil motor about a pivot point for moving a magnetic head at a distal end of each actuator arm. The magnetic head writes data onto the tracks of the disc and reads the data recorded on the tracks of the disc. The magnetic head moves in proximity to the disc, wherein the magnetic head is influenced by an airflow generated on a surface of the disc as the disc rotates at a high speed to maintain a minute gap between the magnetic head on the actuator arm and the disc.

Design requirements for actuator performance and positional accuracy for disc drives are continually becoming more stringent. In particular, the head disc assembly (HDA) is expected to survive extreme external shock events where the accelerations encountered often exceed 1000 g's. Extensive experimental and design efforts has been expended to understand and improve the HDA performance associated with these extreme disturbances to the HDA such as those encountered during topple drop testing. It is known that the head stack assembly (HSA) including the actuator body and bearing assembly is a key component in the HDA. Improving the uniformity of the HSA is a primary key to overall enhancement of the HDA with regard the aforementioned shock events.

Several methods currently exist for integrating the bearing cartridge and the actuator body of the actuator assembly of the disc drive. One method does not include a bearing cartridge, but instead includes boding the bearings directly into a bore in the actuator body. The other method includes the use of the separate bearing cartridge where the bearings are first assembled and preloaded into a sleeve, which is then attached to the actuator body.

There are several techniques that exist for coupling the bearing cartridge to the actuator body, which meet the requirements of removeability necessary for rework of the actuator assembly, when necessary. Three of the most common are (1) a tolerance ring press fit, (2) set screws through the actuator body into the bearing cartridge, and (3) the use of a spring loaded snap ring. The technique of a tolerance ring press fit and set screws through the actuator body into the bearing cartridge are not widely used due to high manufacturing costs and increased unreliability.

Most of the current desktop products today are using the snap ring technique which provides the snap ring receivable within a groove in the bearing cartridge and acting against the actuator body to secure the bearing cartridge therein. Unfortunately, the snap ring techniques has several major disadvantage. In particular, with the snap ring technique, the bearing cartridge is not actually rigidly fixed to the actuator body. The resulting actuator assembly is essentially a spring-mass system that has a large variability due to the tolerances associated with the parts, especially the tolerance between the bearing cartridge and the actuator body. In addition, space available for assembling the actuator assembly with the snap ring technique is very limited thereby creating difficulties during manufacture of the HSA. Furthermore, to meet the high stiffness requirements of the actuator assembly, the spring rates for the snap ring are very high resulting in a actuator assembly design where the final actual spring preload can be highly sensitive to part tolerances and varies over a wide range.

A need therefore exists in the art for attaching a bearing cartridge to an actuator body that improves the interface between the actuator body and the bearing cartridge. It is desirable that this be achieved, moreover, without compromising the actuator assembly performance and the interface between the actuator body and bearing cartridge. The present invention solves these problems and offers other advantages over the prior art.

SUMMARY OF THE INVENTION

The present invention relates to an actuator assembly that has a bearing cartridge threadable to an actuator body in an actuator assembly for a disc drive. The disc drive has at least one rotating disc for storing information. The actuator assembly has an actuator body having a mounting opening with at least a portion of the mounting opening being threaded and a bearing cartridge having an outer surface with at least a portion of the outer surface being threaded. The bearing cartridge is threadably received within the mounting opening of the actuator body thereby releasably securing the actuator body to the bearing cartridge. A method for securing an actuator body to a bearing cartridge in an actuator assembly of a disc drive is provided.

DETAILED DESCRIPTION

Figure 1:
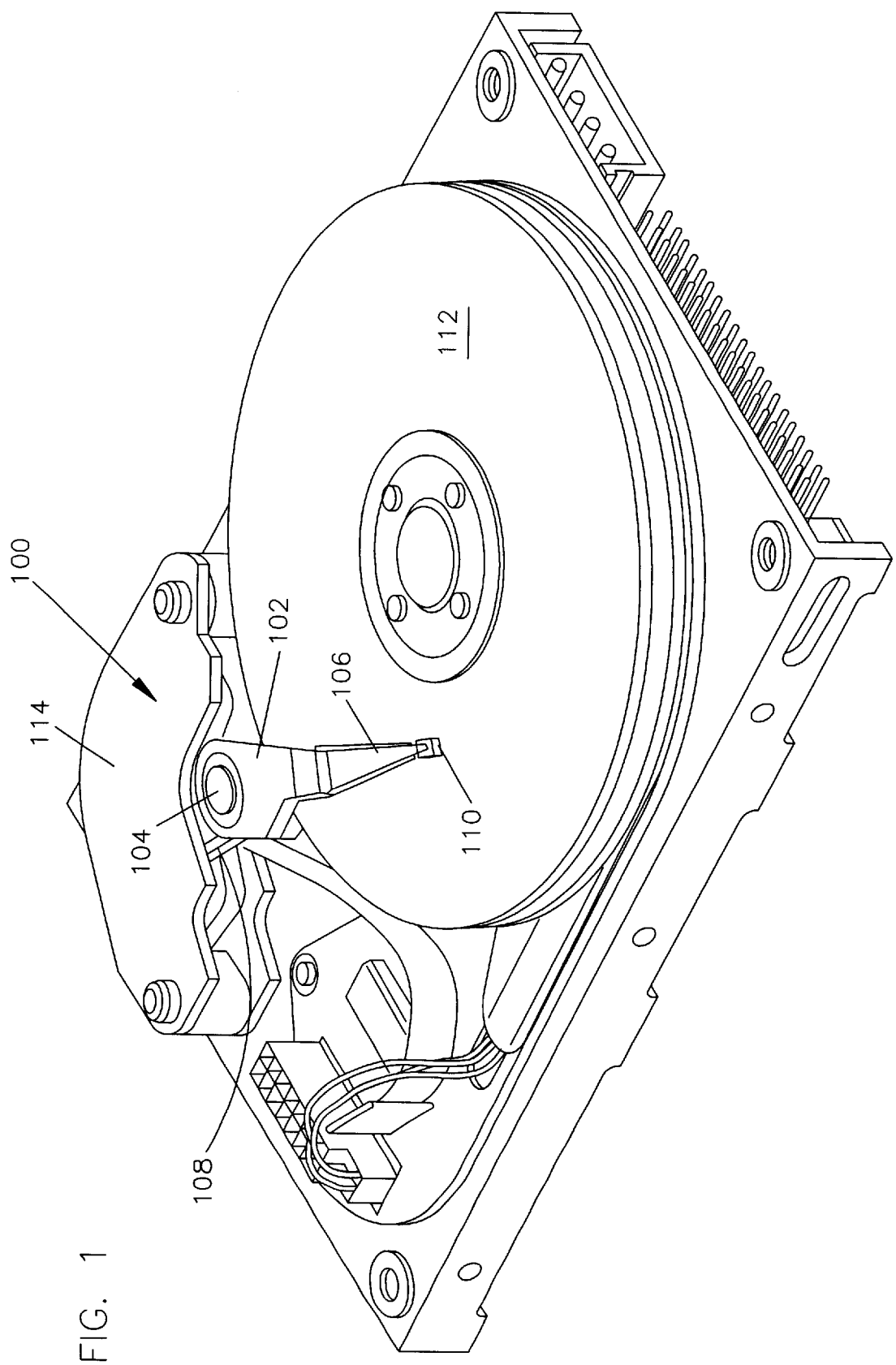
FIG. 1 shows a perspective view of a disc drive incorporating an actuator assembly of the present invention.

As illustrated in FIG. 1, the present invention is an actuator assembly 100 for use in a disc drive. The actuator assembly 100 includes an actuator body 102 and a bearing cartridge 104. As further illustrated in FIG. 2, the actuator body 102 includes at least one actuator arm 106 and a voice coil 108. Each actuator arm 106 includes moving a magnetic head 110, as illustrated in FIG. 1, at a distal end of each actuator arm 106. The magnetic head 110 moves along both sides of at least one disc 112 for writing data onto the tracks (not shown) of each disc 112 and reading the data recorded on the tracks of the disc 112.

A magnet 114, or group of magnets, is positioned relative to the voice coil 108. As a disc drive controller (not shown) causes current to flow through the voice coil 108, the current within the voice coil 108 interact with the magnetic field provided by the magnets 114 and cause rotation of the actuator body 102 thereby moving the magnetic heads 110 at the distal end of each actuator arm 106 across each of the discs 112.

Figure 3:
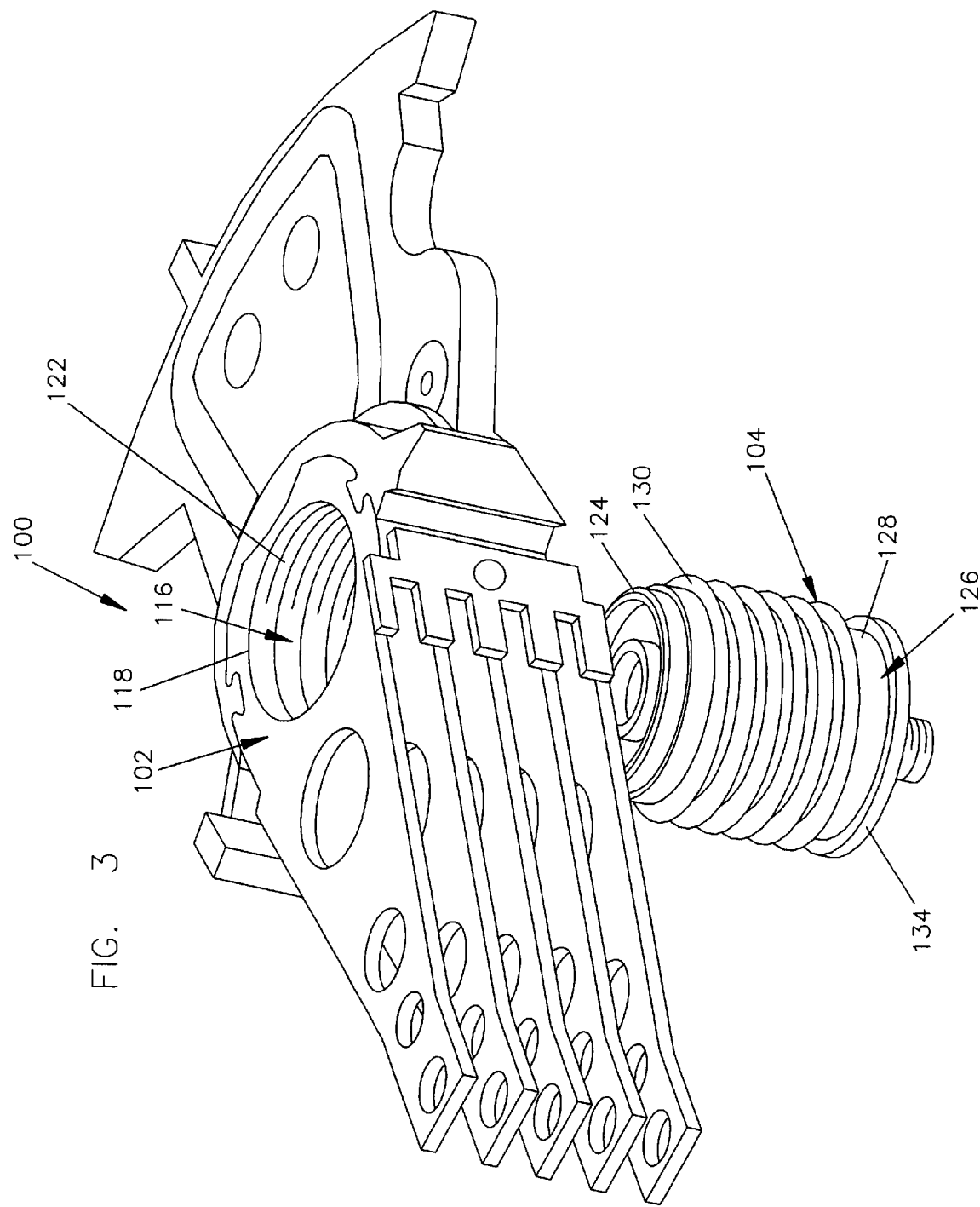
FIG. 3 shows a top perspective view of the actuator assembly implementing the present invention.
Figure 4:
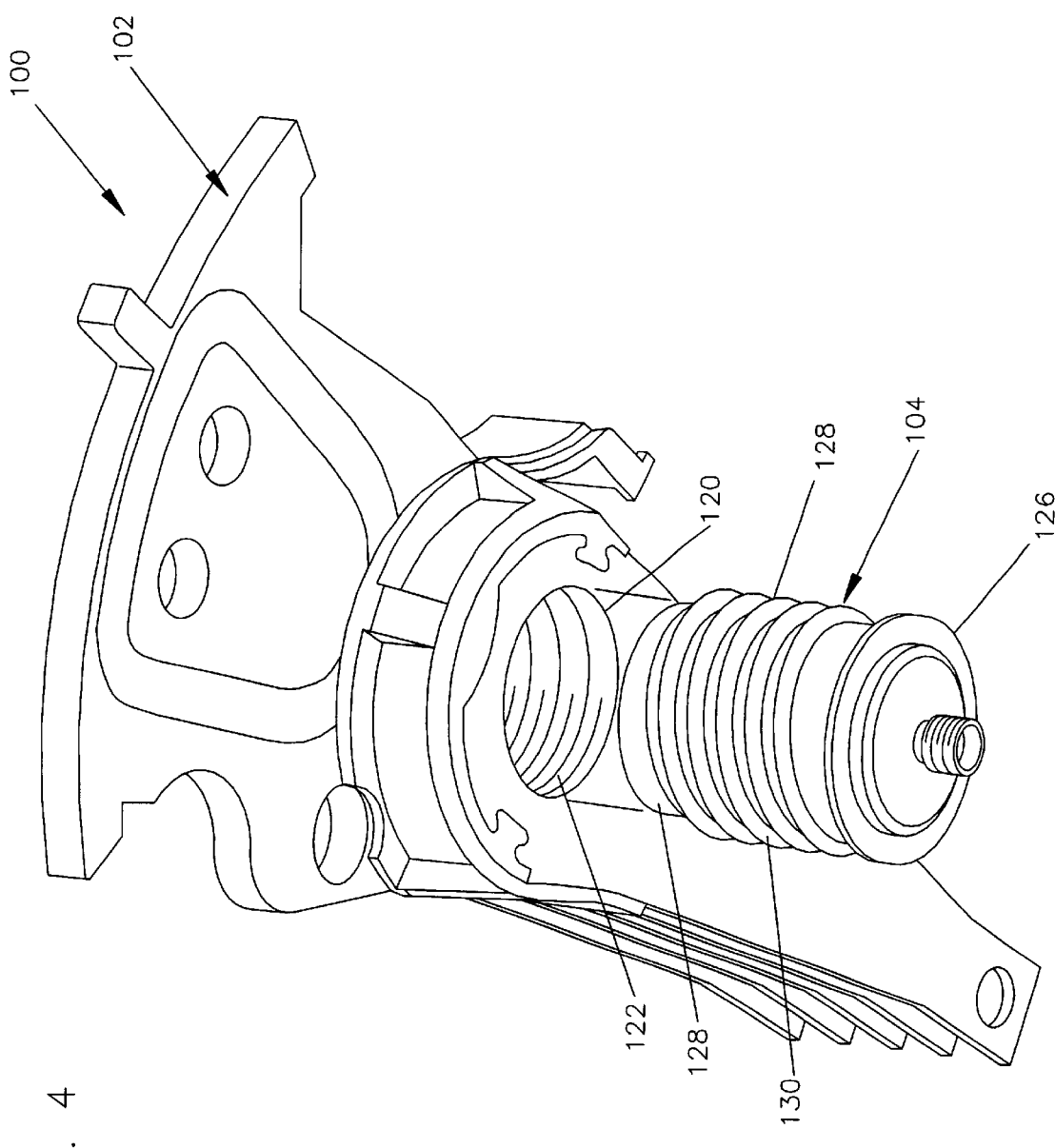
FIG. 4 shows a bottom perspective view of the actuator assembly implementing the present invention.

As illustrated in FIG. 3 and FIG. 4, the actuator body 102 of the actuator assembly 100 of the present invention further includes a mounting opening 116 for receiving the bearing cartridge 104. The mounting opening 116 includes a first mounting opening end 118 and a second mounting opening end 120.

The mounting opening 116 further includes actuator body threads 122 formed along at least a portion of the mounting opening 116. The actuator body threads 122 can extend within the mounting opening 116 from the first mounting opening end 118 to the second mounting opening end 120, from the first mounting opening end 118 to a point distant from the second mounting opening end 120, from the second mounting opening end 120 to a point distant from the first mounting opening end 118, and/or within the mounting opening 116 distant from both the first mounting opening end 118 and the second mounting opening end 120. In any event, the actual extent of the actuator body threads 122 within the mounting opening 116 is not important to the functionality of the present invention so long as the bearing cartridge 104 can be releasably secured within the mounting opening 116 of the actuator body 102, as set forth below.

The bearing cartridge 104 of the actuator assembly 100 of the present invention includes a first bearing end 124 and a second bearing end 126 with an outer surface 128 surrounding the bearing cartridge 104 between the first bearing end 124 and the second bearing end 126. The outer surface 128, similar to the mounting opening 116 of the actuator body 102, has bearing threads 130 formed thereon which are compatibly threadable with the actuator threads 122 within the mounting opening 116 of the actuator body 102.

The bearing threads 130 of the bearing cartridge 104 are formed on the outer surface 128 in a corresponding position relative to the actuator threads 122 formed within the bearing opening 116 to substantially threadably receive the bearing cartridge 104 within the mounting opening 116 of the actuator body 102. Preferably, the actuator threads 122 within the mounting opening 116 extend a predetermined distance further than the bearing threads 130 on the outer surface 128 of the bearing cartridge 104 to insure proper preload of the bearing cartridge 104 within the mounting opening 116 of the actuator body 102.

In any event the pitch and diameter of the actuator threads 122 and the bearing threads 130 can be designed and fabricated over a wide range of pitches and diameters to optimize the manufacturability and cost of the actuator assembly 100. It should be noted, however, that regardless of the pitch and diameter, the bearing cartridge 104 must be threadable within the mounting opening 116 of the actuator body 102 to releasably secure the bearing cartridge 104 to the actuator body 102.

In operation of the actuator assembly 100 of the present invention, the bearing cartridge 104 is threaded into the mounting opening 116 of the actuator body 102. As illustrated in FIG. 4, counter bores 132 can be provided on either the first bearing end 124 or the second bearing end 126 of the bearing cartridge 104, depending on the direction of attachment, to allow a spanner wrench (not shown) to be used to screw the bearing cartridge 104 into the mounting opening 116 of the actuator body 102. Other means of screwing the bearing cartridge 104 into the bearing opening 116 of the actuator body 102 are within the scope of the present invention.

Referring back to FIG. 3 and FIG. 4, in an embodiment of the present invention, the bearing cartridge 104 further includes a bearing flange 134 extending about either the first bearing end 124 or the second bearing end 126. The bearing cartridge 104 is threaded into the mounting opening 116 until the bearing flange 134 of the bearing cartridge 104 contacts the actuator body 102 adjacent either the first mounting opening end 118 or the second mounting opening end 120 of the actuator body 102 thereby providing an accurate location of the bearing cartridge 104 within the actuator body 102 and high effective preload of the actuator assembly 100. The bearing flange 134, in effect, limits the extent of insertion of the bearing cartridge 104 into the mounting opening 116 of the actuator body 102.

Figure 5:
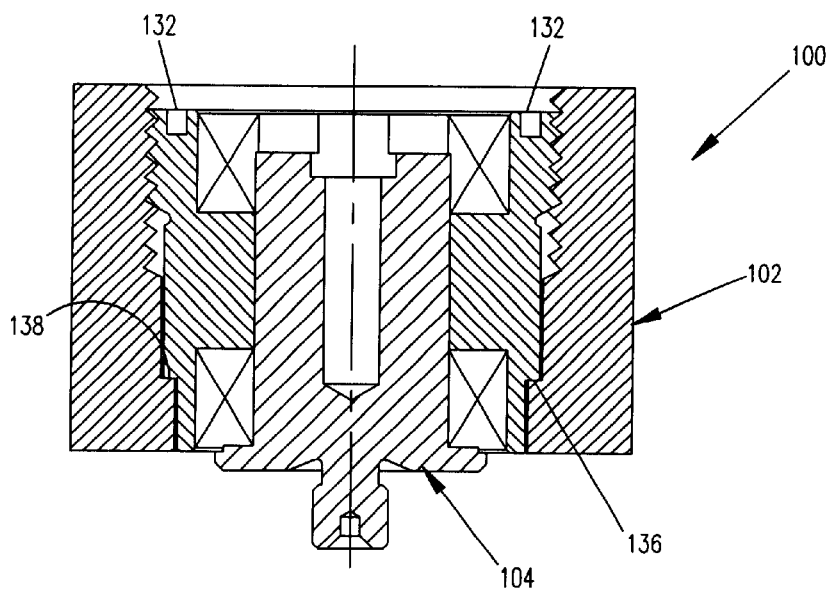
FIG. 5 shows a sectional view of an embodiment of the actuator assembly implementing the present invention.
Figure 6:
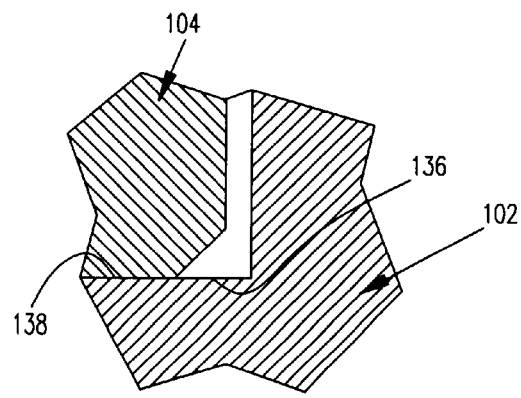
FIG. 6 shows a sectional view of a chamfered portion of the bearing cartridge of the actuator assembly implementing the present invention of FIG. 5.
Figure 7:
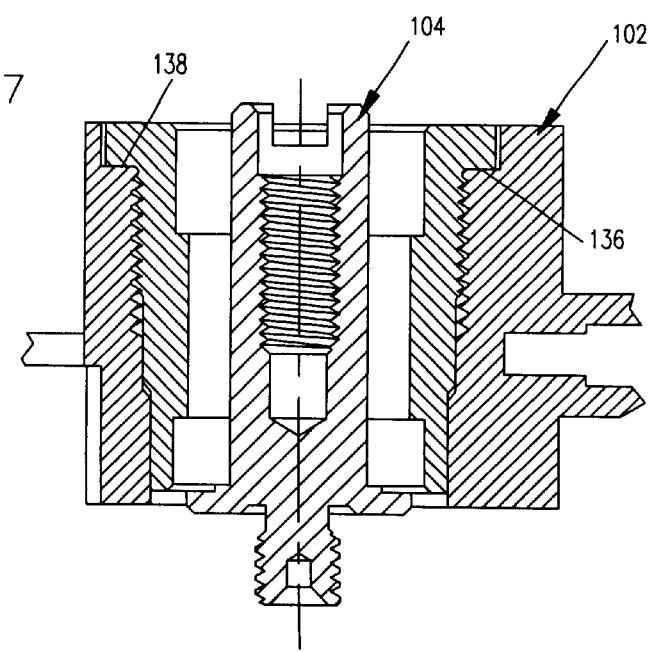
FIG. 7 shows a sectional view of another embodiment of the actuator assembly implementing the present invention.

As illustrated in FIG. 5, FIG. 6, and FIG. 7, in another embodiment of the present invention, the mounting opening 116 of the actuator body 102 includes an opening shoulder 136 and the outer surface 128 of the bearing cartridge 104 includes a bearing shoulder 138. In operation, the bearing cartridge 104 is threaded into the bearing opening 116 until the bearing shoulder 138 of the bearing cartridge 104 contacts the opening shoulder 136 of the actuator body 102. Once again, the contact of the bearing shoulder 138 with the opening shoulder 136 provides an accurate location of the bearing cartridge 104 within the actuator body 102 and high effective preload of the actuator assembly 100 of the present invention.

As illustrated in FIG. 6, the bearing shoulder 138 can be chamfered. Chamfering of the bearing shoulder 138 allows the bearing shoulder 138 to clear the side wall of the bearing opening 116 and seat against the opening shoulder 136 in a firm and solid manner.

Figure 2:
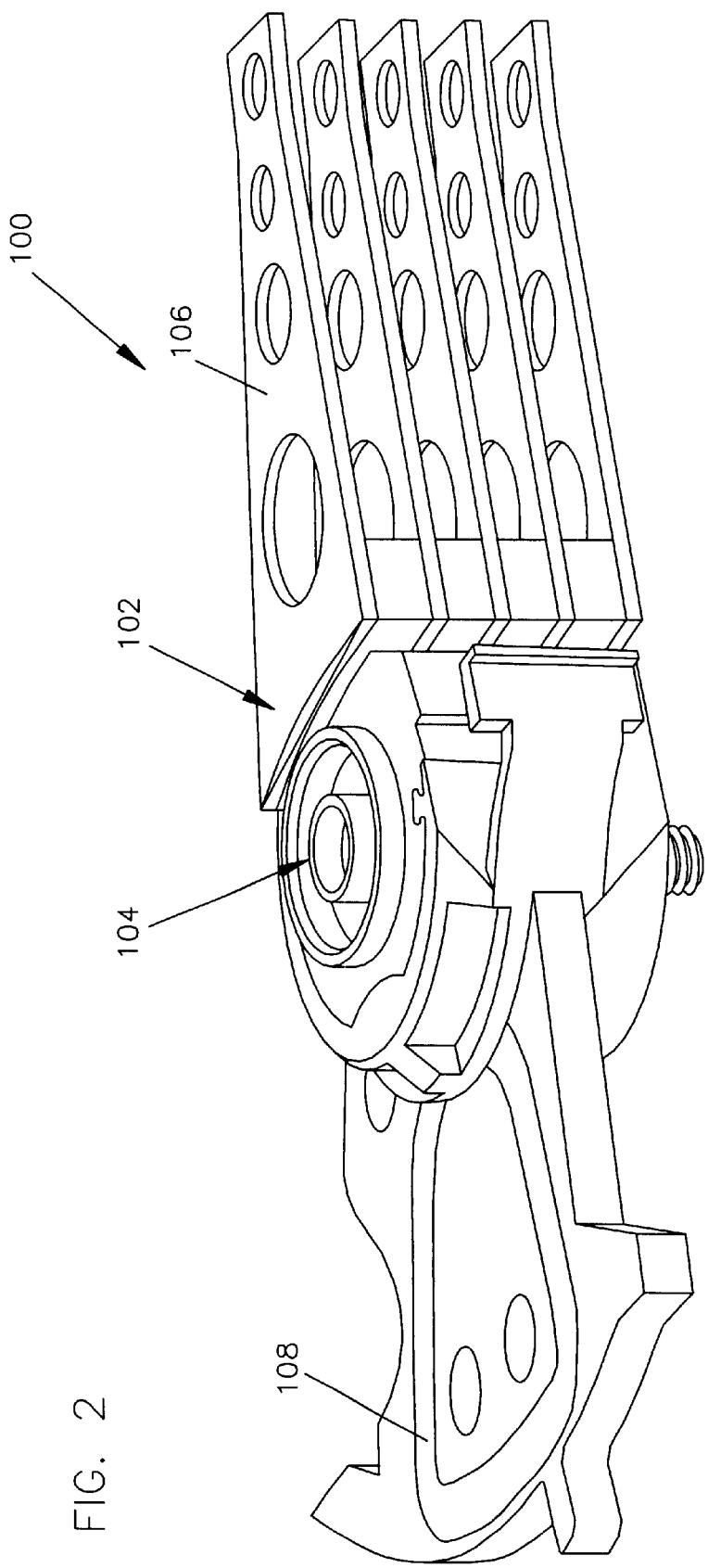
FIG. 2 shows a perspective view of an actuator assembly of the present invention.

The present invention can be summarized in reference to FIG. 2, FIG. 3, and FIG. 4, which are perspective views of the preferred embodiment actuator assembly 100. The actuator assembly 100 includes an actuator body 102 having a mounting opening 116 with at least a portion of the mounting opening 116 being threaded. The actuator assembly 100 further includes a bearing cartridge 104 having an outer surface 128 with at least a portion of the outer surface 128 being threaded. The bearing cartridge 104 is threadably received within the mounting opening 116 of the actuator body 102 so that the actuator body 102 is releasably secured to the bearing cartridge 104.

Preferably, the threads 122 of the actuator body 102 extend a greater distance than the threads 130 of the bearing cartridge 104. Furthermore, the actuator body 102 has a first end 118 and a second end 120 with the threads 122 of the actuator body 102 extending completely from the first end 118 to the second end 120. In the alternative, the threads 122 of the actuator body 102 can extend from the first end 118 to a point distant from the second end 120.

In an embodiment of the actuator assembly 100, the bearing cartridge 104 includes a bearing flange 134 for limiting the extent of the bearing cartridge 104 travel within the mounting opening 116. The bearing flange 134 contacts the actuator body 102 upon the bearing cartridge 104 being releasably secured within the actuator body 102.

In another embodiment of the actuator assembly 100, the actuator body 102 includes an actuator shoulder 136 within the mounting opening 116 and the bearing cartridge 104 includes a bearing shoulder 140 for limiting the extent of the bearing cartridge 104 travel within the mounting opening 116. The actuator shoulder 136 contacts the bearing shoulder 140 upon the bearing cartridge 104 being releasably secured within the actuator body 102.

In still another embodiment of the actuator assembly 100, a method of assembling the actuator assembly 100 comprises a step of threadably engaging the bearing cartridge 104 with the mounting opening 116 of the actuator body 102.

The actuator assembly 100 of the present invention allows the bearing cartridge 104 to be releasably secured to the actuator body 102 thereby creating an essentially rigid actuator assembly 100 without the wide variability in spring constant rates associated with conventional spring loaded snap rings. Additionally, the actuator assembly 100 directly improves the interface between the actuator body 102 and the bearing cartridge 104 and thus extends the potential performance of the actuator assembly 100. Simultaneously, the actuator assembly 100 meets the critical factor requirements of the interface between the bearing cartridge 104 and the actuator body 102.

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are largely directed to disc drives, it will be appreciated by those skilled in the art that the teachings of the present invention can be applied to other data handling systems such as wireless communication without departing from the scope and spirit of the present invention.

What is claimed is:

1. An actuator assembly for a disc drive, the disc drive having at least one rotating disc for storing information, the actuator assembly comprising:
   an actuator body having a mounting opening, at least a portion of the mounting opening being threaded;
   at least one arm extending from the actuator body, the arm defining a plane which intersects the threaded portion; and
   a bearing cartridge having an outer surface, at least a portion of the outer surface being threaded, the bearing cartridge threadably receivable within the mounting opening of the actuator body so that the body is releasably secured to the bearing cartridge.

2. The actuator assembly of claim 1 wherein the bearing cartridge includes a flange, the flange contactable with the actuator body upon the bearing cartridge being releasably secured within the actuator body and limiting the extent of the bearing cartridge travel within the mounting opening.

3. The actuator assembly of claim 1 wherein the actuator body includes an actuator shoulder within the mounting opening and the bearing cartridge includes a bearing shoulder, the actuator shoulder contactable with the bearing shoulder upon the bearing cartridge being releasably secured within the actuator body and limiting the extent of the bearing cartridge travel within the mounting opening.

4. The actuator assembly of claim 1 wherein the threads of the actuator body extend a first predetermined distance and the threads of the bearing cartridge extend a second predetermined distance, the first predetermined distance being greater than the second predetermined distance.

5. The actuator assembly of claim 1 wherein the actuator body has a first end and a second end, the threads of the actuator body extending completely from the first end to the second end.

6. The actuator assembly of claim 1 wherein the actuator body has a first end and a second end, the threads of the actuator body extending from the first end to a point distant from the second end.

7. The actuator assembly of claim 1, in which the arm is configured to support a read/write head.

8. The actuator assembly of claim 1, in which the arm is configured to support a coil.

9. The actuator assembly of claim 1, in which the actuator body is integrally formed.

10. An actuator assembly, the actuator assembly comprising:
    an actuator body;
    at least one arm extending from the actuator body;
    a bearing cartridge for rotating the actuator body; and
    means for mounting the actuator body to the bearing cartridge.

11. The actuator assembly of claim 10 wherein the mounting means comprises first threads formed in the actuator body and second threads formed on the bearing cartridge, the bearing cartridge threadably receivable within the bearing receiving opening of the actuator body so that the actuator body is releasable secured to the bearing cartridge.

12. The actuator assembly of claim 10 and further comprising means for limiting the extent of travel of the bearing cartridge within the bearing receiving opening of the body.

13. The actuator assembly of claim 12 wherein the means for limiting the extent of travel is a flange on the bearing cartridge, the flange contactable with the actuator body upon the bearing cartridge being releasably secured within the actual body.

14. The actuator assembly of claim 12 wherein the means for limiting the extent of travel is an actuator shoulder formed on the actuator body and a bearing shoulder formed on the bearing cartridge, the actuator shoulder contactable with the bearing shoulder upon the bearing cartridge being releasably secured within the actuator body.

15. An actuator assembly for a disc drive, the disc drive having at least one rotating disc for storing information, the actuator assembly comprising:
    an actuator body comprising an integrally formed member having an internally threaded bore therein;
    an arm supported by the body and defining a plane which is intersected by the actuator body;
    a pivot assembly mounted within the bore.

16. The actuator assembly of claim 15, in which the bore extends entirely through the actuator body.

17. The actuator assembly of claim 15, in which a portion of the bore is not threaded.

18. The actuator assembly of claim 15, in which the pivot assembly includes a threaded portion.

19. The actuator assembly of claim 15, in which the arm is configured to support a read/write head.

* * * * *